US006937143B2

(12) United States Patent
Ohtaka

(10) Patent No.: US 6,937,143 B2
(45) Date of Patent: Aug. 30, 2005

(54) PASSENGER DETECTING APPARATUS FOR VEHICLE

(75) Inventor: Koji Ohtaka, Chiryu (JP)

(73) Assignees: Denso Corporation, Kariya (JP); Fuji Jukogyo Kabushiki Kaisha, Tokyo (JP)

( * ) Notice: Subject to any disclaimer, the term of this patent is extended or adjusted under 35 U.S.C. 154(b) by 125 days.

(21) Appl. No.: 10/673,338

(22) Filed: Sep. 30, 2003

(65) Prior Publication Data

US 2004/0075569 A1 Apr. 22, 2004

(30) Foreign Application Priority Data

Oct. 2, 2002 (JP) ....................................... 2002-289722

(51) Int. Cl.[7] .................................................. B60Q 1/00

(52) U.S. Cl. ................. 340/438; 340/457.1; 340/425.5; 340/667; 701/45; 73/1.01; 73/1.08; 73/862; 180/273

(58) Field of Search .............................. 340/438, 457.1, 340/425.5, 667; 701/45; 180/273; 324/207.12; 280/735; 73/1.01, 1.08, 862

(56) References Cited

U.S. PATENT DOCUMENTS

| | | | | | |
|---|---|---|---|---|---|
| 6,509,653 | B2 | * | 1/2003 | Fujimoto et al. | 307/10.1 |
| 6,509,747 | B2 | * | 1/2003 | Nagai et al. | 324/687 |
| 6,546,817 | B1 | | 4/2003 | Aoki | |
| 6,817,254 | B2 | | 11/2004 | Aoki | |
| 2003/0216886 | A1 | | 11/2003 | Hattori et al. | |

FOREIGN PATENT DOCUMENTS

| | | | |
|---|---|---|---|
| JP | 2000-280813 | | 10/2000 |
| JP | 2000280813 | * | 10/2000 |
| JP | 2000-302003 | | 10/2000 |

* cited by examiner

*Primary Examiner*—Jeffery Hofsass
*Assistant Examiner*—Daniel Previl
(74) *Attorney, Agent, or Firm*—Posz Law Group, PLC

(57) ABSTRACT

The present invention relates to a vehicle passenger detecting apparatus capable of detecting an unoccupied-seat state through the use of existing signals in a vehicle and correcting an unoccupied-seat reference value with a simple configuration. In a case in which an ignition key switch and a buckle switch are in off conditions and a load detecting value, which is the sum of measurement data from load sensors in these conditions, falls below a predetermined unoccupied-seat load value, an occupied-seat reference value serving as a load measurement standard for detection of a state of a vehicle passenger is corrected using the load detection value. This eliminates the influence of vibrations stemming from engine revolutions and electrical noises and enables the reference value to be corrected using a stabler load detection value.

16 Claims, 6 Drawing Sheets

PASSENGER DETECTING APPARATUS FOR VEHICLE

BACKGROUND OF THE INVENTION

1) Field of the Invention

The present invention relates to a vehicle passenger detecting apparatus which makes a decision on a state of a passenger (including a driver) sitting on a seat of a vehicle and transmits the state information to a vehicle passenger protecting apparatus.

2) Description of the Related Art

So far, there has been proposed a vehicle passenger detecting apparatus in which a load sensor is placed under a vehicle seat to detect a variation of pressure stemming from a passenger load for making a decision on a state of a passenger. In such a apparatus, a drift of the measurement reference (standard) for load sensor output can occur due to the mechanical accustomization of a load sensor and a seat component, applied mechanical repeated vibrations, applied mechanical impacts, environmental variations such as variations of temperature and humidity, and aging. In addition, when a drift of the measurement reference occurs, difficulty is experienced in making an accurate decision on the passenger state through the use of that load sensor. Therefore, for the accurate decision on the passenger state, there is a need to correct an unoccupied-seat reference serving as a measurement reference by precisely detecting an unoccupied seat and detecting a variation of an 0-kg load output.

So far, in consideration of such objects, there has been proposed a technique in which, in addition to a load sensor placed under a seat, a mat-type passenger presence/absence discrimination sensor is placed under a surface of a hip-supporting portion of a seat to make a decision/detection on an unoccupied state of the seat and, when a passenger is absent on the seat, a correction is made with respect to the measurement data from a load sensor (see Japanese Patent Laid-Open No. 2000-302003). This conventional technique can precisely detect the fact that a seat is in an unoccupied state, thereby correcting an unoccupied-seat reference.

There is a problem which arises with the conventional technique disclosed in Japanese Patent Laid-Open No. 2000-302003, however, in that the employment of the unoccupied-seat discrimination sensor and the load sensor increases the number of components of a vehicle seat, which leads to increasing the number of assembling steps and the cost of parts.

SUMMARY OF THE INVENTION

The present invention has been developed with a view to eliminating such a problem, and it is therefore an object of the invention to provide a vehicle passenger detecting apparatus with a simple construction capable of detecting an unoccupied state through the use of an existing signal in a vehicle for making a correction of an unoccupied-seat reference.

For this purpose, in accordance with an aspect of the present invention, there is provided a vehicle passenger detecting apparatus in which a load sensor is provided to detect a load acting on a vehicle seat on the basis of a distortion of a seat adjuster portion so that a load detection value taken when the vehicle seat is in an unoccupied state is stored as an unoccupied-seat reference value in advance and a state of a seated passenger on the vehicle seat is detected on the basis of a relative value between a load detection value from the load sensor and the unoccupied-seat reference value, the apparatus being characterized by comprising reference correcting means for, in a case in which an ignition key switch and a buckle switch are in off conditions (turning-off conditions) and a load detection value from the load sensor in the off conditions falls below an unoccupied-seat load value set in advance, correcting the unoccupied-seat reference value through the use of the load detection value from the load sensor.

Thus, when both the ignition key switch and buckle switch are in the off conditions and a load detection value obtained by the load sensor in the off conditions falls below the unoccupied-seat load value set in advance, the reference correcting means corrects the unoccupied-seat reference value through the use of the load detection value obtained by the load sensor. In this case, since the ignition key switch is in the off condition, a detection of the fact that the vehicle is in a stopping condition becomes possible. Moreover, since the buckle switch is in the off condition, a detection of the fact that a vehicle seat belt is in an unfastened condition becomes possible. Still moreover, because of making it a condition that a load detection value from the load sensor in the off conditions falls below an unoccupied-seat load value set in advance, a detection of the fact that a passenger does not sit on the vehicle seat and a heavy baggage or the like does not exists on the vehicle seat becomes possible. That is, in a case in which not only the vehicle is in a stopping condition but also a passenger does not sit on the vehicle seat and even a heavy baggage or the like does not exists on the vehicle seat, an unoccupied-seat state is recognizable, and the unoccupied-seat reference value is corrected on the basis of a load detection value from the load sensor in this state. Moreover, while the vehicle is moving, a state of a seated passenger on the vehicle seat is detected on the basis of a relative value between the load detection value from the load sensor and the corrected unoccupied-seat reference value.

Accordingly, even if a drift of an unoccupied-seat reference value for load sensor output can occur due to the mechanical accustomization of a seat adjuster portion, applied mechanical repeated vibrations, applied mechanical impacts, environmental variations such as variations of temperature and humidity, and aging, the unoccupied-seat reference value is securely corrected by the reference correcting means, which enables a state of a seated passenger to be detected with high accuracy. Moreover, when the vehicle is in a stopping condition, it is possible to more stably correct the unoccupied-seat reference value on the basis of a stabler lead detection value from the load sensor without receiving influence of vibrations due to the engine revolution or the like or electrical noises. Still moreover, because of the employment of signals from the ignition key switch and the buckle switch which are the existing signals in a vehicle, there is no need to additionally use a sensor or the like for the detection of the unoccupied state, thus avoiding an increase in assembling steps and cost.

In addition, in accordance with a further aspect of the present invention, there is provided a vehicle passenger detecting apparatus comprising a seat track interposed between a floor and a seat cushion frame to make the seat cushion frame movable in longitudinal directions of a vehicle with respect to the floor and a load sensor for detecting a load acting on the seat cushion frame on the basis of a displacement of the seat cushion frame with respect to an upper rail of the seat track, wherein a load detection value taken when a vehicle seat is in an unoccupied state is stored as an unoccupied-seat reference value in advance and a state of a seated passenger on the vehicle seat is detected on the basis of a relative value between a load detection value from the load sensor and the unoccupied-seat reference value, the apparatus being characterized by comprising reference correcting means for, in a case in which an ignition key switch and a buckle switch are in off conditions and a load detection value from the load sensor in the off conditions falls below an unoccupied-seat load value set in advance, correcting the unoccupied-seat reference value through the use of the load detection value from the load sensor.

Thus, when both the ignition key switch and buckle switch are in the off conditions and a load detection value obtained by the load sensor in the off conditions falls below the unoccupied-seat load value set in advance, the reference correcting means corrects the unoccupied-seat reference value through the use of the load detection value obtained by the load sensor. In this case, the state where the ignition key switch is in the off condition signifies the fact that the vehicle is in a stopping condition. Moreover, the state where the buckle switch is in the off condition signifies the fact that a vehicle seat belt is in an unfastened condition. Still moreover, the state where a load detection value from the load sensor in the off conditions falls below an unoccupied-seat load value set in advance signifies the fact that a passenger does not sit on the vehicle seat and a heavy baggage or the like does not exists on the vehicle seat. That is, in a case in which not only the vehicle is in a stopping condition but also a passenger does not sit on the vehicle seat and even a heavy baggage or the like does not exists on the vehicle seat, an unoccupied-seat state is recognizable, and the unoccupied-seat reference value is corrected on the basis of a load detection value from the load sensor in this state. Moreover, while the vehicle is moving, a state of a seated passenger on the vehicle seat is detected on the basis of a relative value between the load detection value from the load sensor and the corrected unoccupied-seat reference value.

Accordingly, even if a drift of an unoccupied-seat reference value for load sensor output can occur due to the mechanical accustomization of the seat track and the seat cushion frame, applied mechanical repeated vibrations, applied mechanical impacts, environmental variations such as variations of temperature and humidity, and aging, the unoccupied-seat reference value is securely corrected by the reference correcting means, which enables a state of a seated passenger to be detected with high accuracy. Moreover, when the vehicle is in a stopping condition, it is possible to more stably correct the unoccupied-seat reference value on the basis of a stabler lead detection value from the load sensor without receiving influence of vibrations due to the engine revolution or the like or electrical noises. Still moreover, because of the employment of signals from the ignition key switch and the buckle switch which are the existing signals in a vehicle, there is no need to additionally use a sensor or the like for the detection of the unoccupied state, thus avoiding an increase in assembling steps and cost.

Still additionally, according to a further aspect of the present invention, in the vehicle passenger detecting apparatus, the unoccupied-seat reference value is stored in a rewritable-type non-volatile memory.

Therefore, the unoccupied-seat reference value to be stored in the non-volatile memory is rewritten whenever a correction of the unoccupied-seat reference value takes place, and, even after the power-off, the stored contents are maintainable.

Yet additionally, according to a further aspect of the present invention, in the vehicle passenger detecting apparatus, the reference correcting means does not correct the unoccupied-seat reference value in a case in which the load detection value from the load sensor when both the ignition key switch and the buckle switch are in off conditions exceeds a predetermined threshold.

Since it is considered that the case in which the load detection value from the load sensor when both the ignition key switch and the buckle switch are in off conditions exceeds a predetermined threshold corresponds to a case in which some abnormality such as a trouble of the load sensor or influence of a noise occurs, the correction of the unoccupied-seat reference value is inhibited in such situations, thereby preventing the unoccupied-seat reference value based on an abnormal detection value from being stored.

Moreover, according to a further aspect of the present invention, the vehicle passenger detecting apparatus further comprises abnormality history storing means for storing abnormality history information indicative of a detection of an abnormal value in a case in which the load detection value from the load sensor when both the ignition key switch and the buckle switch are in off conditions exceeds a predetermined threshold, and the reference correcting means does not correct the unoccupied-seat reference value when the abnormality history information is stored in the abnormality history storing means.

Thus, when the abnormality history information is stored in the abnormality history storing means, since the reliability of the present load detection value from the load sensor is considered to be low, the correction of the unoccupied-seat reference value is inhibited in such a case, thereby avoiding the storing of the unoccupied-seat reference value based on the low-reliability detection value.

Still moreover, according to a further aspect of the present invention, in the vehicle passenger detecting apparatus, the reference correcting means automatically corrects the unoccupied-seat reference value on a predetermined cycle.

Thus, since the reference correcting means automatically corrects the unoccupied-seat reference value on a predetermined cycle, a state of a seated passenger is detectable through the use of the latest unoccupied-seat reference value at all times.

In addition, according to a further aspect of the present invention, in the vehicle passenger detecting apparatus, the reference correcting means is operated in a low power consumption mode during a waiting period in the case of the unoccupied-seat reference value being automatically corrected on the predetermined cycle.

Thus, in a case in which the unoccupied-seat reference value is automatically corrected on the predetermined cycle, the reference correcting means is operated in a low power consumption mode during a waiting period, which can suppress the power consumption.

Still additionally, according to a further aspect of the present invention, in the vehicle passenger detecting apparatus, the reference correcting means is operable through the use of a battery mounted in the vehicle.

Thus, since the reference correcting means is operable with the vehicle battery, there is no need to use a power source additionally, and since the reference correcting means is operated in a low power consumption mode during the waiting period in the case of the automatic correction of the unoccupied-seat reference value to be implemented when the ignition key switch is in an off condition, it is possible to reduce the power consumption of the vehicle battery.

Yet additionally, according to a further aspect of the present invention, in the vehicle passenger detecting apparatus, a load detection value from the load sensor is stored in time series, and the reference correcting means corrects the unoccupied-seat reference value through the use of a plurality of load detection values taken in time series.

Thus, since the reference correcting means corrects the unoccupied-seat reference value through the use of a plurality of load detection values taken in time series, the influence of noise or the like is surely reducible, which enables the unoccupied-seat reference value to be corrected with higher accuracy.

BRIEF DESCRIPTION OF THE DRAWINGS

Other objects and features of the present invention will become more readily apparent from the following detailed description of the preferred embodiment taken in conjunction with the accompanying drawings in which.

DESCRIPTION OF THE PREFERRED EMBODIMENTS

Figure 1:
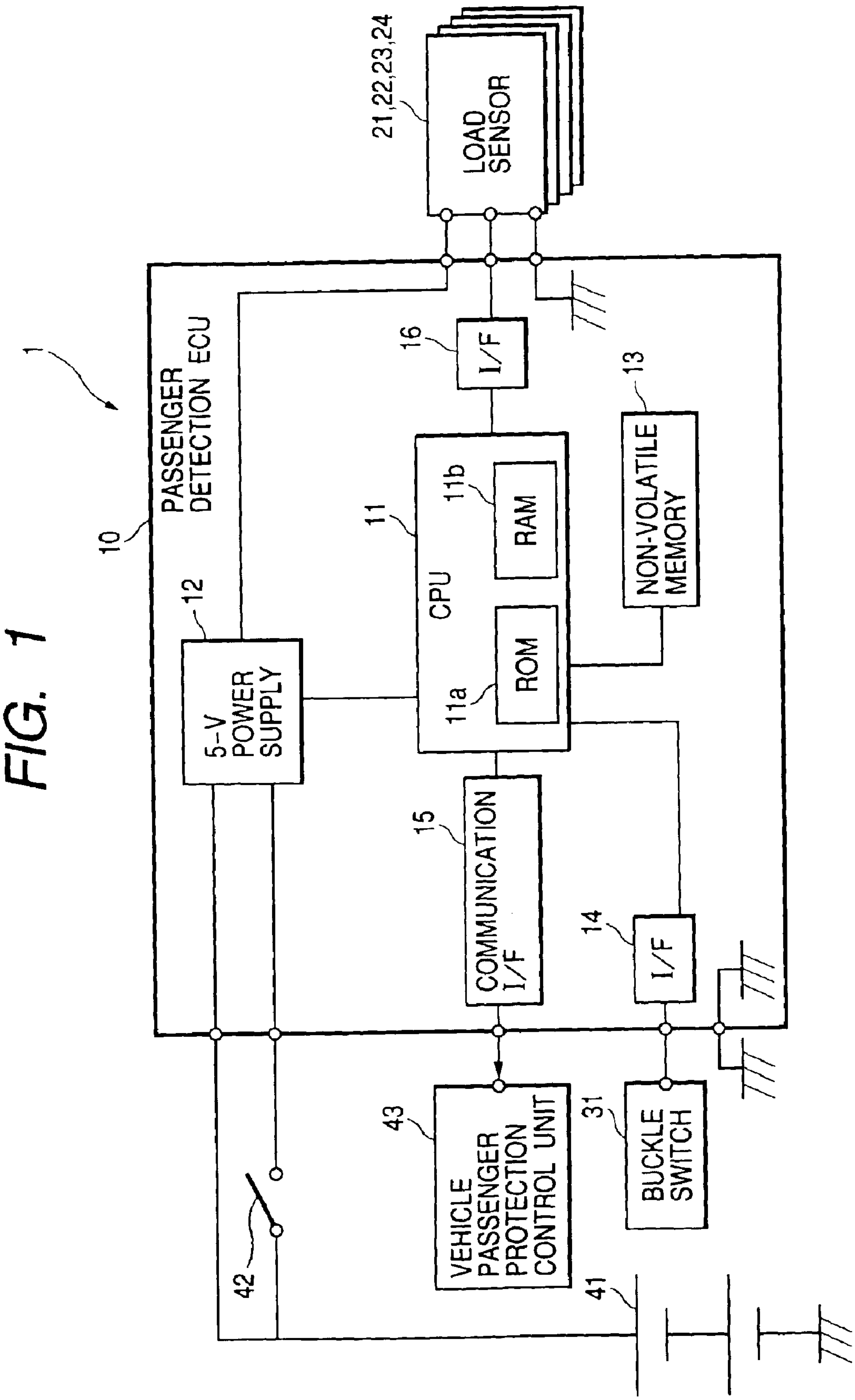
FIG. 1 is a block diagram showing a hardware configuration of a vehicle passenger detecting apparatus according to an embodiment of the present invention.
Figure 2:
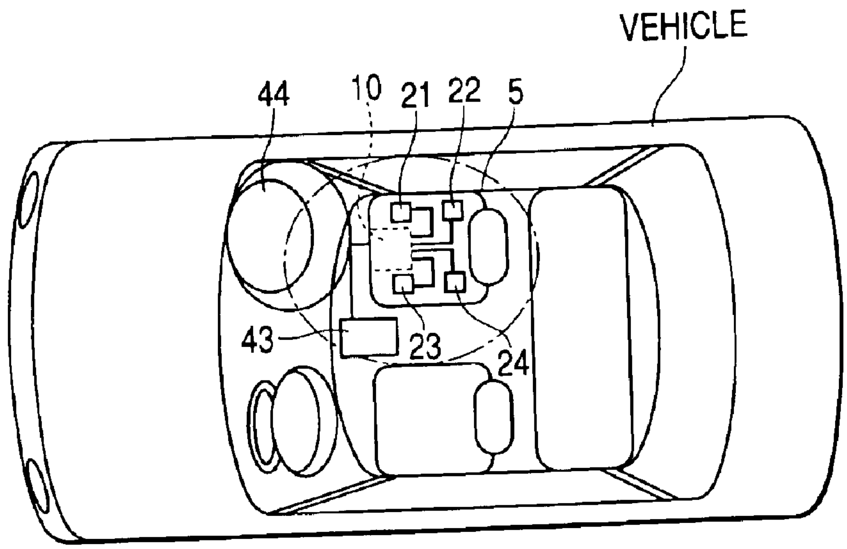
FIG. 2 is an plan view illustratively showing locations of components of the vehicle passenger detecting apparatus according to the embodiment in a vehicle.
Figure 3:
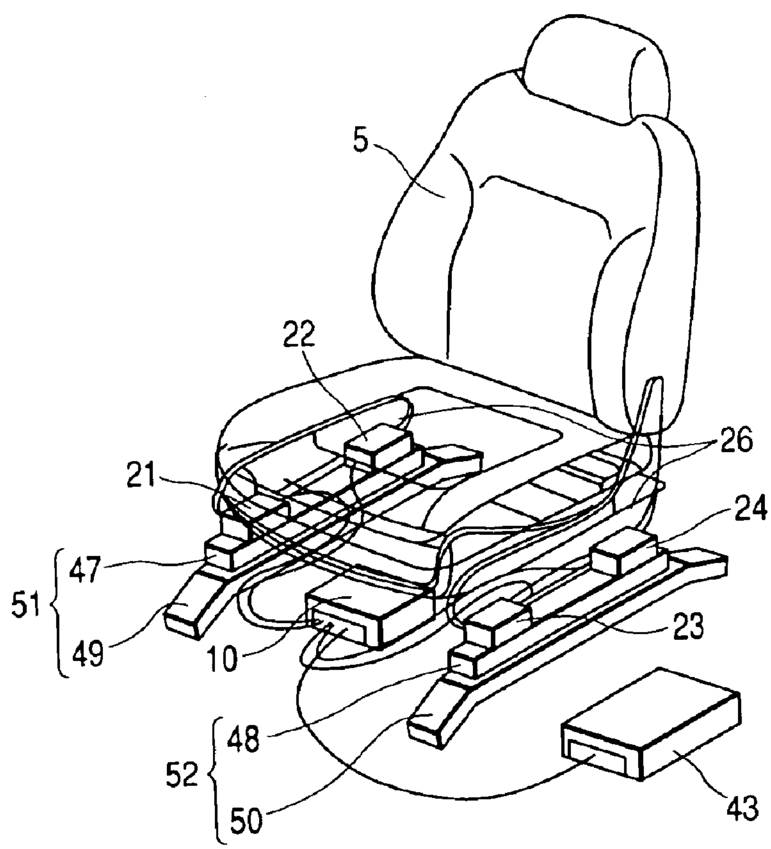
FIG. 3 is a perspective view showing locations of the components of the vehicle passenger detecting apparatus according to the embodiment in the vehicle.

A vehicle passenger detecting apparatus according to an embodiment of the present invention will be described hereinbelow with reference to the drawings. FIG. 1 is a block diagram showing a hardware configuration of a vehicle passenger detecting apparatus according to this embodiment, FIG. 2 is an plan view illustratively showing locations of components constituting the vehicle passenger detecting apparatus according to the embodiment in a vehicle, and FIG. 3 is a perspective view showing locations of the components of the vehicle passenger detecting apparatus in the vicinity of a vehicle seat (portion surrounded by an alternate long and short dash line in FIG. 2) in the vehicle.

As FIG. 1 shows, a vehicle passenger detecting apparatus, generally designated at reference numeral 1, is made up of a passenger detection electronic control unit (which will be referred to hereinafter as a "passenger detection ECU") 10 and four distortion-type load sensors 21, 22, 23 and 24. The distortion-type load sensors 21 to 24 constitute the load sensor in the present invention.

The passenger detection ECU 10 is placed under a vehicle seat 5 (see FIGS. 2 and 3) and, as shown in FIG. 1, is composed of a CPU (Central Processing Unit) 11, a 5-V power supply source 12, a non-volatile memory 13, a buckle switch interface (I/F) 14, a communication interface (I/F) 15 and a load sensor interface (I/F) 16. Although in FIGS. 2 and 3 the vehicle passenger detecting apparatus 1 is located at an assistant driver's seat, it is also appropriate that the apparatus 1 is located at another seat. For example, in consideration of the extendibility of the system, it is also preferable that the vehicle passenger detecting apparatus 1 according to this embodiment is placed at the driver's seat, a rear seat or the like.

The CPU 11 is connected to an ignition key switch (IG-SW) 42 connected to a vehicle battery 41 so that the switching between its activation and stop is made in accordance with an on/off signal from the ignition key switch 42, and operates in response to power supply from the 5-V power supply source 12. The CPU 11 internally includes a ROM 11*a* and a RAM 11*b*, and reads out a passenger detection processing program and an automatic correction processing routine from the ROM 11*a* and implements it. The RAM 11*b* has an area to be used as a work area by the CPU 11, and others.

The 5-V power supply source 12 is for supplying power for operations to internal circuits of the passenger detection ECU 10, and is connected to two power supply systems: a power supply system from the vehicle battery 41 serving as an operating power supply source and a power supply system from the ignition key switch 42 connected to the vehicle battery 41.

The non-volatile memory 13 is of a rewritable type, and the stored contents therein are electrically rewritable. The non-volatile memory 13 stores unoccupied-seat reference values and abnormality history information which will be described later.

The buckle switch I/F 14 is connected through a communication line to a buckle switch 31, and is an interface circuit having a function to receive an on/off signal from the buckle switch 31 through the communication line and to put it in the CPU 11.

The communication I/F 15 is connected through a communication line to a vehicle passenger protection control unit 43 for controlling a vehicle passenger protecting device such as an air bag, and is an interface circuit having a function to transmit a decision result on a passenger state obtained in the CPU 11 through the communication line to the vehicle passenger protection control unit 43.

As shown in FIGS. 2 and 3, the load sensors 21 to 24 are placed at a right-side front portion, a right-side rear portion, a left-side front portion and a left-side rear portion under the vehicle seat 5, respectively, and each is made to output a load, applied to each portion of the vehicle seat 5, in the form of an analog voltage signal. In more detail, as shown in FIG. 3, in the interior of the vehicle, seat tracks 51 and 52 are fixedly secured onto a floor of the vehicle, and each of the seat tracks 51 and 52 is composed of a seat track lower rail 49, 50 fixed to the floor of the vehicle and a seat track upper rail 47, 48 made to allow the vehicle seat 5 slide forwardly and rearwardly. The load sensors 21 to 24 are placed between the seat track upper rail 47, 48 and seat cushion frames 26, and are designed to detect a load acting on the seat cushion frames 26 on the basis of displacement of the seat cushion frames 26 with respect to the seat track upper rail 47, 48. Moreover, the distortion-type load sensors 21 to 24 are made to operate in response to a power supply from the aforesaid 5-V power supply source 12 in the passenger detection ECU 10.

The seat tracks 51, 52 and the seat cushion frames 26 constitute the seat adjuster portion in the present invention.

The vehicle passenger protection control unit 43 is for executing spread control on an air bag 44 serving as a vehicle passenger protecting device, and as shown in FIGS. 2 and 3, is placed in the interior of the vehicle and is connected through a communication line to a communication I/F 15 of the passenger detection ECU 10. In a case in which a G sensor (not shown) detects the occurrence of collision of a vehicle, the vehicle passenger protection control unit (air bag ECU) 43 executes the spread control on the air bag 44 , i.e., bag spread implementation/stop control or bag spreading quantity control according to the type of a passenger (adult, child, or the like), in accordance with a state of a passenger from the passenger detection ECU 10.

For example, when the information on passenger state from the passenger detection ECU 10 indicates "unoccupied seat", the vehicle passenger protection control unit 43 does not execute the bag spreading irrespective of a detection of a vehicle collision. Moreover, when a vehicle collision is detected and the passenger state indicates "adult", the vehicle passenger protection control unit 43 executes control for spreading the bag maximally. On the other hand, if a vehicle collision is detected and the passenger state indicates "child", the vehicle passenger protection control unit 43 controls the bag spread to an appropriate degree.

Figure 5:
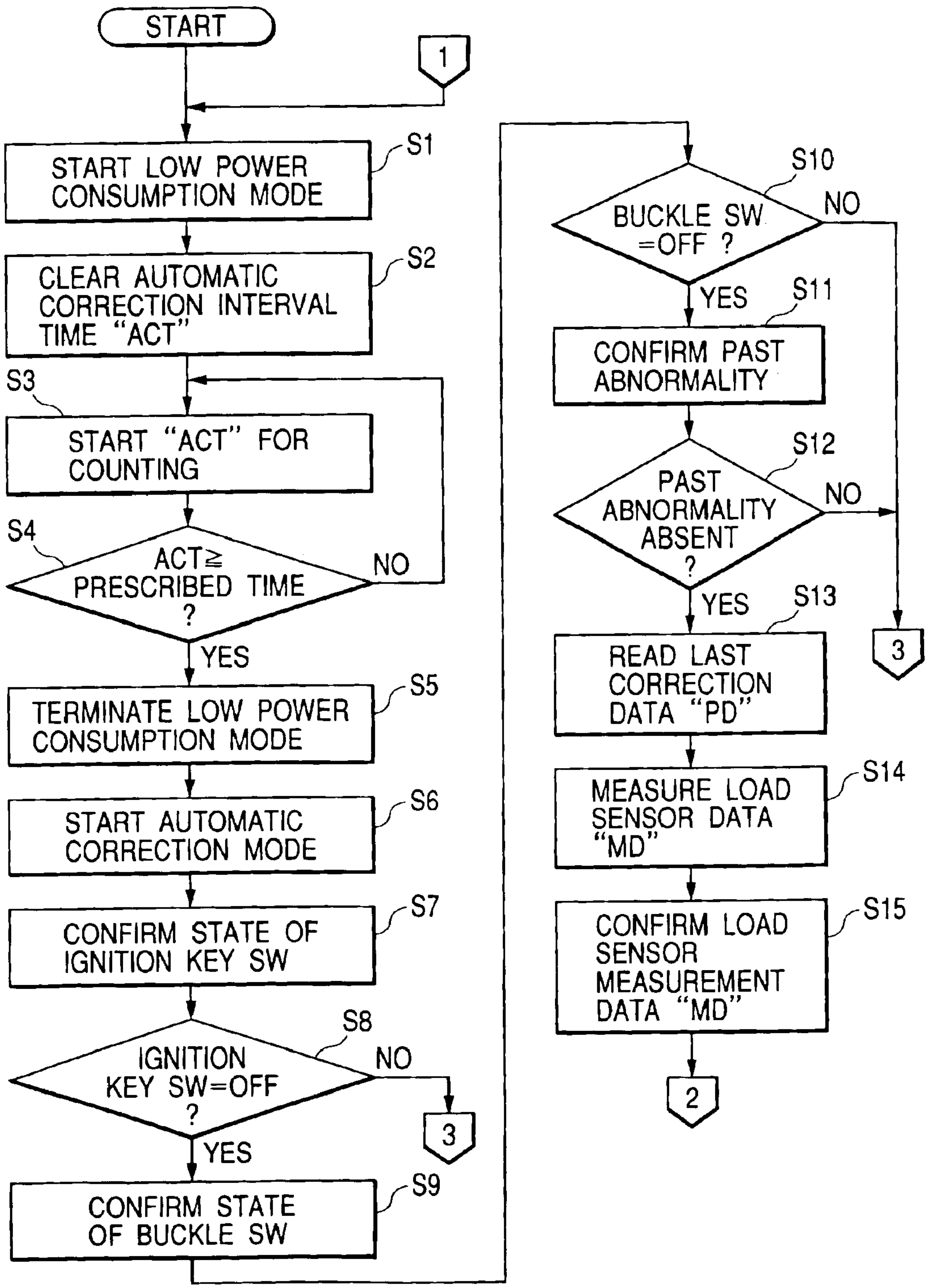
FIG. 5 is a flow chart showing a flow of an automatic correction routine for an unoccupied-seat reference value according to the embodiment.
Figure 6:
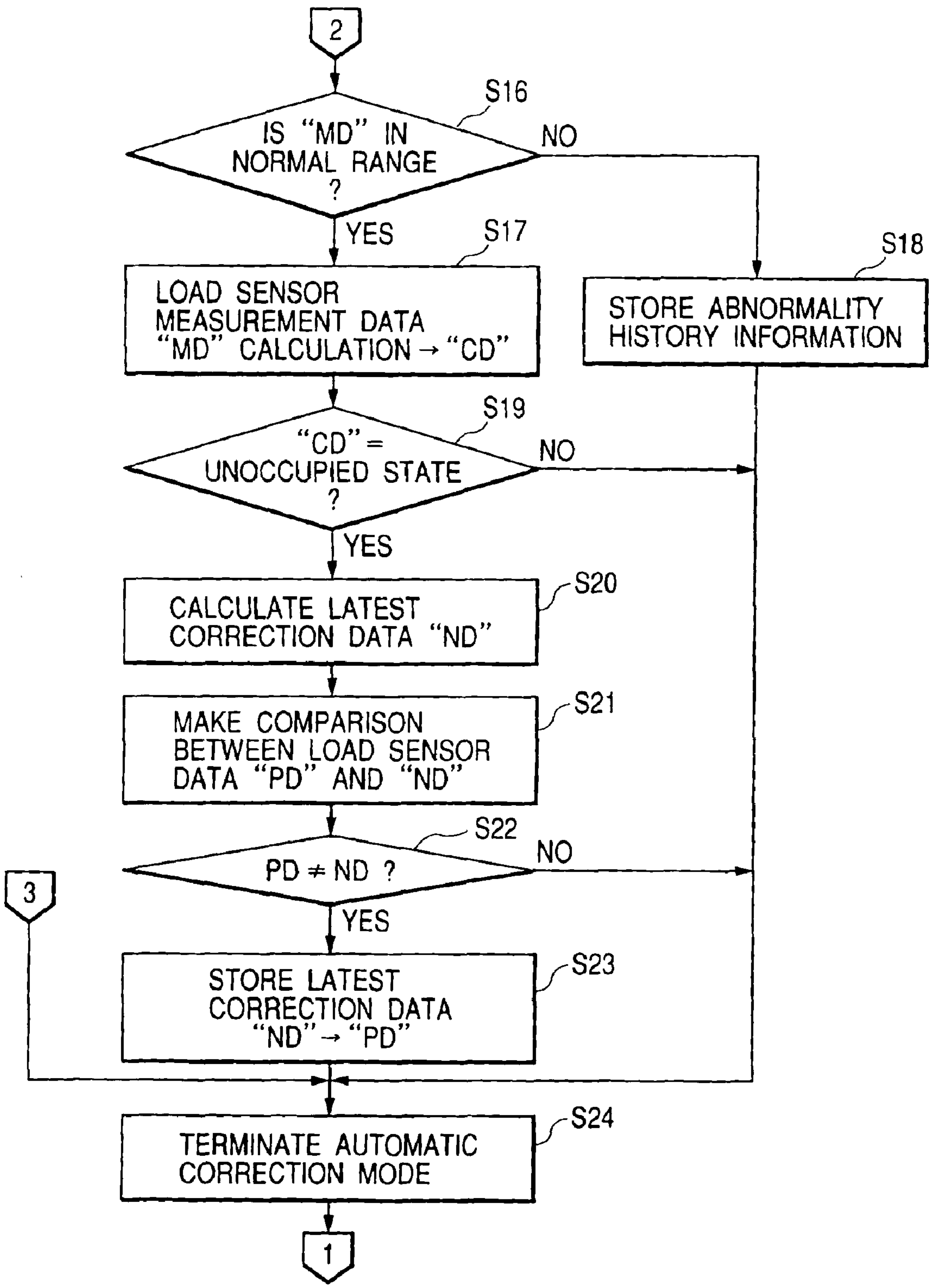
FIG. 6 is a flow chart showing a flow of the automatic correction routine for an unoccupied-seat reference value according to the embodiment.

Secondly, referring to FIGS. 4 to 6, a description will be given hereinbelow of processing for automatically correcting an unoccupied-seat reference value according to this embodiment. In this case, the "unoccupied-seat reference value" is a value forming a load measurement standard in the vehicle seat 5, and corresponds to a load sensor output at 0-kg load. In the following description, the data obtained by correcting an unoccupied-seat reference value according to automatic correction processing will be referred to as "unoccupied-seat reference value correction data" or referred to simply as "correction data".

Figure 4:
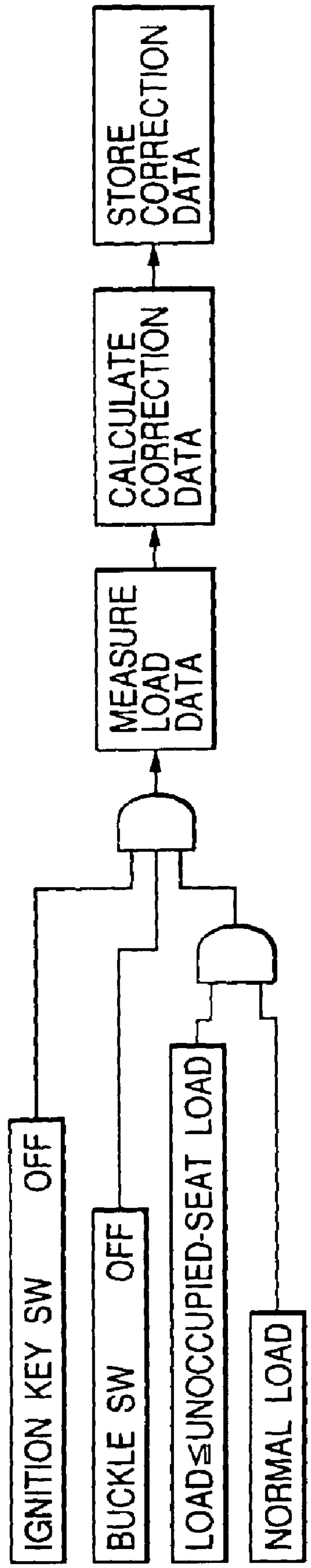
FIG. 4 is a block diagram schematically showing a flow of correction of an unoccupied-seat reference value according to the embodiment.

FIG. 4 is a block diagram schematically showing conditions of the correction of an unoccupied-seat reference value and steps to be implemented until the unoccupied-seat reference value correction data is stored in a non-volatile memory. That is, the unoccupied-seat reference value correction is made when 1) the ignition key switch 42 is in an off state, 2) the buckle switch 31 is in an off state, 3) a load taken when the switches 42 and 31 are the off states falls below a predetermined unoccupied-seat load and 4) a load is in a normal load range. That is, the unoccupied-seat reference value correction is satisfied when the AND conditions of 1) to 4) are satisfied. After the measurement of lead data and the calculation of correction data based on the load data, the correction data is stored in the non-volatile memory 13.

Furthermore, referring to flow charts of an automatic correction processing routine of FIGS. 5 and 6, a detailed description will be given hereinbelow of the automatic correction processing on an unoccupied-seat reference value. The CPU 11 reads out this routine from the ROM 11*a* and implements it when, in a state of a normal operating mode in which the ignition key switch 42 is in an on condition (turning-on condition) and a decision is made on a passenger on the vehicle seat 5, the ignition key switch 42 is turned off.

When this routine is read out therefrom, a low power consumption mode first starts (step 1, which will be referred to simply as "S1", and the other steps as well as this step 1). In this case, the "low power consumption mode" signifies an operating mode in which the CPU 11 operates at a current value lower than usual, and only a time measuring operation for an automatic correction interval is conducted during this mode.

When the low power consumption mode starts, an automatic correction interval timer "ACT" is cleared (initialized) (S2). The timer "ACT" conducts the counting operation (S3), and a decision is made as to whether or not the timer "ACT" reaches a prescribed automatic correction interval time (which will be referred to hereinafter as a "prescribed time") (S4). If it does not reach the prescribed time (S4: No), the steps 3 and 4 are implemented repeatedly. In this case, for example, the prescribed time is set at approximately one hour. In this connection, the prescribed time depends on the with-time magnitude of an actual correction quantity.

On the other hand, when the timer "ACT" reaches the prescribed time (S4: Yes), the low power consumption mode comes to an end (S5), and the automatic correction mode starts (S6). In the automatic correction mode, a confirmation is made on a state of the ignition key switch 42 (S7). In a case in which the ignition key switch 42 is in the on condition (S8: No), the automatic correction mode comes to an end (S24).

If the ignition key switch 42 is in the off condition (S8: Yes), a confirmation is made on a state of the buckle switch 31 (S9). If the buckle switch 31 is in the on condition (S10: No), the automatic correction mode comes to an end (S24).

If the buckle switch 31 is in the off condition (S10: Yes), past history information is read out from the non-volatile memory 13 (S11), and a decision is made as to whether abnormality history information exists or not (S 12). If the abnormality history information exists (S12: No), the automatic correction mode comes to an end (S24). In this case, the "abnormality history information" is information indicative of the fact that an abnormal value was outputted from the load sensors 21 to 24.

In the case of no abnormality history information (S12: Yes), the last correction data "PD" is read out from the non-volatile memory 13 (S13). Subsequently, the output signals "MD" from the four load sensors 21 to 24 are measured (S14), and a decision is made as to whether or not each of the load sensor measurement data "MD" falls below a predetermined threshold, that is, whether it is in a normal range (S15). If the data "MD" is out of the normal range (S16: No), abnormality history information is stored in the non-volatile memory 13 (S18), and the automatic correction mode comes to an end (S24). The threshold to be used for making a decision as to whether or not the data "MD" is in the normal range is set to a vehicle in which the passenger detection ECU 10 is mounted.

If the data "MD" is in the normal range (S16: Yes), the sum of the "MDs" outputted from the load sensors 21 to 24 is calculated, thereby obtaining an unoccupied-seat decision value "CD" (S17). If the decision value "CD" exceeds a predetermined unoccupied-seat load value, that is, when a passenger sits on the vehicle seat 5 or a baggage exists thereon (S19: No), the automatic correction mode comes to an end (S24). The "unoccupied-seat load value" is a threshold to be used for making a decision on an unoccupied-seat state, and is set at a value obtained by adding a predetermined margin to the dead weight of the vehicle seat 5. Therefore, the unoccupied-seat load value is set to a vehicle in which the passenger detection ECU 10 is mounted.

On the other hand, if the decision value "CD" is below the predetermined unoccupied-seat lead value, that is, in the case of an unoccupied state (S19,: Yes), the latest correction data "ND" is calculated on the basis of the decision value "CD" (S20). In this case, the correction data "ND" is calculated so that the passenger decision is appropriately made when the ignition key switch 42 is turned on after the present correction operation. Moreover, a comparison is made between the last correction data "PD" and the latest correction data "ND" (S21), and if the last correction data "PD" and the present correction data "ND" are equal to each other (S22: No), the automatic correction mode comes to an end (S24). On the other hand, if the last correction data "PD" and the present correction data "ND" are different from each other (S22: YES), the latest correction data "ND" is stored in the non-volatile memory 13 as correction data "PD" for the next correction operation (S23), and the automatic correction mode comes to an end (S24). After the completion of the automatic correction mode (S24), the operational flow again returns to the step 1 and subsequent steps.

Figure 7:
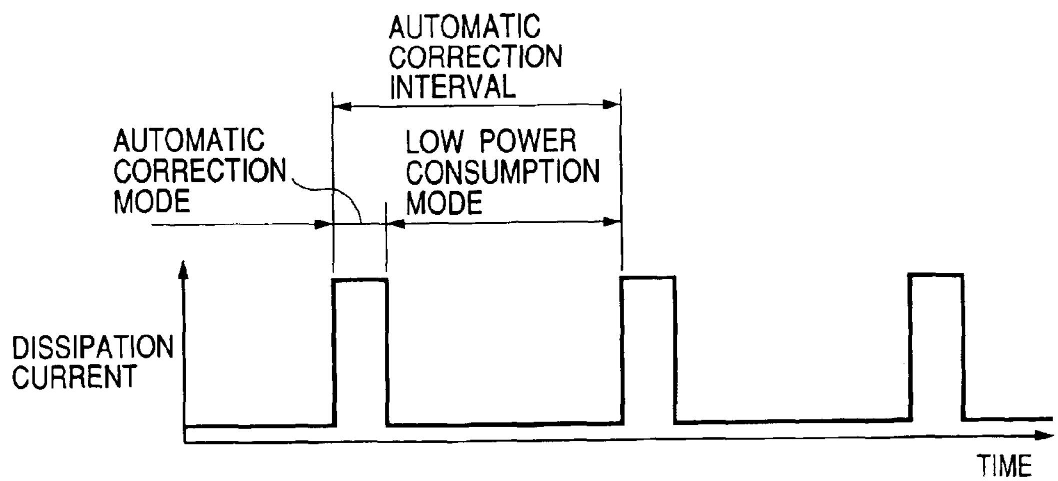
FIG. 7 is a graphic illustration of a variation of dissipation current in the implementation of the automatic correction routine according to the embodiment.

FIG. 7 is a graphic illustration of a variation of dissipation current at the implementation of the automatic correction routine. As obvious from FIG. 7, the automatic correction mode and the low power consumption mode are repeated on a predetermined cycle (automatic correction interval), and the dissipation current becomes high during the automatic correction mode while it is suppressible during the low power consumption mode.

As seen from the above detailed description, according to this embodiment, in a case in which both the ignition key switch 42 and the buckle switch 31 are in the off conditions and a load detection value "CD" which is the sum of the measurement data "MD" from the load sensors 21 to 24 in this conditions is below a predetermined unoccupied-seat load value, the unoccupied-seat reference value (previous correction data) is corrected through the use of that load detection value. Accordingly, since the ignition key switch 42 is in the off condition, the fact that the vehicle is in a stopping condition is detectable. Moreover, since the buckle switch 31 is in the off condition, the fact that the vehicle seat belt is in the unfastened condition is detectable. Still moreover, since a load detection value obtained by the load sensors 21 to 24 in these conditions is below a predetermined unoccupied-seat load value, the fact that a passenger does not sit on the vehicle seat 5 and a heavy baggage or the like does not exist thereon is detectable. That is, when the vehicle is in the stopping state and a passenger, a heavy baggage or the like does not exist on the vehicle seat 5, the state of the vehicle is recognized as an unoccupied-seat state, and the unoccupied-seat reference value is corrected using a load detection value obtained by the load sensors 21 to 24 in this state. In addition, in a normal mode when the vehicle is moving, a state of a seated passenger on the vehicle seat 5 is detected on the basis of a relative value between a load detection value obtained by the load sensors 21 to 24 and the corrected unoccupied-seat reference value. In this case, the "detection of a state of a seated passenger" signifies, for example, a detection of "adult sits thereon", "child sits thereon", or "seat is unoccupied".

Accordingly, even if a drift of an unoccupied-seat reference value for load sensor output occurs due to the mechanical accustomization of a seat adjuster portion (seat cushion frames 26 and the seat tracks 51 and 52), applied mechanical repeated vibrations, applied mechanical impacts, environmental variations such as variations of temperature and humidity, and aging, the unoccupied-seat reference value is securely corrected through the processing in the automatic correction routine, which enables a state of a seated passenger to be detected with high accuracy. Moreover, when the vehicle is in a stopping condition, it is possible to more stably correct the unoccupied-seat reference value on the basis of stabler lead detection values from the load sensors 21 to 24 without receiving influence of vibrations due to the engine revolution or the like or electrical noises. Still moreover, because of the employment of signals from the ignition key switch 42 and the buckle switch 31 which are the existing signals in a vehicle, there is no need to additionally use a sensor or the like for the detection of the unoccupied state, thus avoiding an increase in assembling steps and cost.

Furthermore, according to this embodiment, since the unoccupied-seat reference value (correction data) is stored in the rewritable-type non-volatile memory 13, whenever the unoccupied-seat reference value undergoes correction, the unoccupied-seat reference value to be stored in the non-volatile memory 13 can be rewritten and the stored contents can be maintained even after the power-off.

Still furthermore, according to this embodiment, in a case in which a load detection value obtained by the load sensors 21 to 24 when both the ignition key switch 42 and the buckle switch 31 are in the off conditions exceeds a predetermined threshold, the correction of the unoccupied-seat reference value is inhibited. The case of "a load detection value obtained by the load sensors 21 to 24 when both the ignition key switch 42 and the buckle switch 31 are in the off conditions exceeds a predetermined threshold" can signify a case in which some abnormality such as a trouble of the load sensors 21 to 24 or influence of a noise occurs, and the correction of the unoccupied-seat reference value is not made in such situations, thereby preventing the unoccupied-seat reference value based on an abnormal detection value from being stored.

Moreover, according to this embodiment, in a case in which a load detection value obtained by the load sensors 21 to 24 when both the ignition key switch 42 and the buckle switch 31 are in the off conditions exceeds a predetermined threshold, abnormality history information indicative of the detection of an abnormal value is stored in the non-volatile memory 13, and if the abnormality history information is stored in the non-volatile memory 13, the correction of the unoccupied-seat reference value is inhibited. In the case of the abnormality history information being stored in the non-volatile memory 13, since it can be considered that the reliability of the present load detection values from the load sensors 21 to 24 is low, the correction of the unoccupied-seat reference value is not made in such situations, which avoids storing the unoccupied-seat reference value based on a low-reliability detection value.

Still moreover, according to this embodiment, since the unoccupied-seat reference value is made to be automatically corrected on a predetermined cycle (automatic correction interval), a state of a seated passenger is detectable with high accuracy through the use of the latest unoccupied-seat reference value.

In addition, according to this embodiment, since the passenger detection ECU 10 is designed to be operable by the vehicle battery 41, there is no need to use a power supply source additionally. Still additionally, since the system is operated in a low power consumption mode during a waiting period in the case of the unoccupied-seat reference value being automatically corrected when the ignition key switch 42 is in the off condition, the power consumption in the vehicle battery 41 is suppressible.

It should be understood that the present invention is not limited to the above-described embodiment, and that it is intended to cover all changes and modifications of the embodiment of the invention herein which do not constitute departures from the spirit and scope of the invention.

For example, although in the above-described embodiment a passenger state decision result is transmitted to the vehicle passenger protection control unit 43 for executing the spread control on the air bag 44, it is also appropriate that the passenger state decision result is transmitted to a control unit for another vehicle passenger protecting device such as a seat belt with pretension or a device for repeatedly winding a seat belt through the use of a motor or the like.

Moreover, although in the above-described embodiment the unoccupied-seat reference value is corrected using the load measurement data at one point of time, it is also appropriate that the load measurement data are stored in time series at a plurality of points of time and the unoccupied-seat reference value is corrected using the plurality of time-series load measurement data. This surely reduce the influence of noise or the like and enables the correction of the unoccupied-seat reference value to be made with higher accuracy.

What is claimed is:

1. A vehicle passenger detecting apparatus in which a load sensor is provided to detect a load acting on a vehicle seat on the basis of a distortion of a seat adjuster portion in a vehicle so that a load detection value taken when said vehicle seat is in an unoccupied state is stored as an unoccupied-seat reference value in advance and a state of a seated passenger on said vehicle seat is detected on the basis of a relative value between a load detection value from said load sensor and said unoccupied-seat reference value, said apparatus comprising reference correcting means for, in a case in which an ignition key switch and a buckle switch are in off conditions and a load detection value from said load sensor in said off conditions falls below an unoccupied-seat load value set in advance, correcting said unoccupied-seat reference value through the use of said load detection value from said load sensor.

2. The apparatus according to claim 1, wherein said unoccupied-seat reference value is stored in a rewritable-type non-volatile memory.

3. The apparatus according to claim 1, wherein said reference correcting means does not correct said unoccupied-seat reference value in a case in which said load detection value from said load sensor when both said ignition key switch and said buckle switch are in the off conditions exceeds a predetermined threshold.

4. The apparatus according to claim 1, further comprising abnormality history storing means for storing abnormality history information indicative of a detection of an abnormal value in a case in which said load detection value from said load sensor when both said ignition key switch and said buckle switch are in the off conditions exceeds a predetermined threshold so that said reference correcting means does not correct said unoccupied-seat reference value when said abnormality history information is stored in said abnormality history storing means.

5. The apparatus according to claim 1, wherein said reference correcting means automatically corrects said unoccupied-seat reference value on a predetermined cycle.

6. The apparatus according to claim 5, wherein said reference correcting means is operated in a low power consumption mode, which suppresses power consumption, during a waiting period in the case of said unoccupied-seat reference value being automatically corrected on said predetermined cycle.

7. The apparatus according to claim 6, wherein said reference correcting means is operable through the use of a battery mounted in said vehicle.

8. The apparatus according to claim 1, wherein said load detection value from said load sensor is stored in time series, and said reference correcting means corrects said unoccupied-seat reference value through the use of a plurality of load detection values taken in time series.

9. A vehicle passenger detecting apparatus comprising:

a seat track interposed between a floor of a vehicle and a seat cushion frame of said vehicle to make said seat cushion frame movable in longitudinal directions of said vehicle with respect to said floor; and a load sensor for detecting a load acting on said seat cushion frame on the basis of a displacement of said seat cushion frame with respect to an upper rail of said seat track, with a load detection value taken when a vehicle seat is in an unoccupied state being stored as an unoccupied-seat reference value in advance and a state of a seated passenger on said vehicle seat being detected on the basis of a relative value between a load detection value from said load sensor and said unoccupied-seat reference value, said apparatus including reference correcting means for, in a case in which an ignition key switch and a buckle switch are in off conditions and a load detection value from said load sensor in said off conditions falls below an unoccupied-seat load value set in advance, correcting said unoccupied-seat reference value through the use of said load detection value from said load sensor.

10. The apparatus according to claim 9, wherein said unoccupied-seat reference value is stored in a rewritable-type non-volatile memory.

11. The apparatus according to claim 9, wherein said reference correcting means does not correct said unoccupied-seat reference value in a case in which said load detection value from said load sensor when both said ignition key switch and said buckle switch are in the off conditions exceeds a predetermined threshold.

12. The apparatus according to claim 9, further comprising abnormality history storing means for storing abnormality history information indicative of a detection of an abnormal value in a case in which said load detection value from said load sensor when both said ignition key switch and said buckle switch are in the off conditions exceeds a predetermined threshold so that said reference correcting means does not correct said unoccupied-seat reference value when said abnormality history information is stored in said abnormality history storing means.

13. The apparatus according to claim 2, wherein said reference correcting means automatically corrects said unoccupied-seat reference value on a predetermined cycle.

14. The apparatus according to claim 13, wherein said reference correcting means is operated in a low power consumption mode, which suppresses power consumption, during a waiting period in the case of said unoccupied-seat reference value being automatically corrected on said predetermined cycle.

15. The apparatus according to claim 14, wherein said reference correcting means is operable through the use of a battery mounted in said vehicle.

16. The apparatus according to claim 9, wherein said load detection value from said load sensor is stored in time series, and said reference correcting means corrects said unoccupied-seat reference value through the use of a plurality of load detection values taken in time series.

* * * * *

UNITED STATES PATENT AND TRADEMARK OFFICE

CERTIFICATE OF CORRECTION

PATENT NO. : 6,937,143 B2
APPLICATION NO. : 10/673338
DATED : August 30, 2005
INVENTOR(S) : Koji Ohtaka and Satoshi Goshima It is certified that error appears in the above-identified patent and that said Letters Patent is hereby corrected as shown below:

Title page, Item (75) Inventors should read

-- (75) Koji Ohtaka, Chiryu (JP)
Satoshi Goshima, Tokyo (JP) --.

Signed and Sealed this

Eighth Day of January, 2008

JON W. DUDAS
*Director of the United States Patent and Trademark Office*